United States Patent [19]

Bahorich

[11] 3,768,338
[45] Oct. 30, 1973

[54] COASTING DOWNSHIFT CONTROL VALVE FOR AN AUTOMATIC POWER TRANSMISSION CONTROL VALVE CIRCUIT

[75] Inventor: Joseph P. Bahorich, Dearborn, Mich.

[73] Assignee: Ford Motor Company, Dearborn, Mich.

[22] Filed: Dec. 27, 1971

[21] Appl. No.: 212,314

[52] U.S. Cl.................. 74/864, 74/752 C, 74/869, 137/596.18
[51] Int. Cl............................................ B60k 21/02
[58] Field of Search................ 74/752 C, 864, 868, 74/869; 137/596.18

[56] References Cited
UNITED STATES PATENTS

| | | | |
|---|---|---|---|
| 3,446,098 | 5/1969 | Searles | 75/869 |
| 3,593,598 | 7/1971 | Winn et al. | 74/869 X |
| 3,625,090 | 12/1971 | Chana | 74/869 X |
| 3,631,950 | 1/1972 | Tanaka | 75/752 C |
| 3,656,373 | 4/1972 | Shimosaki | 74/869 |

Primary Examiner—Allan D. Herrmann
Attorney—Keith L. Zerschling et al.

[57] ABSTRACT

A control valve circuit for an automatic power transmission mechanism in an automotive vehicle driveline having an internal combustion engine, including a pair of transmission ratio shift valves located in fluid pressure circuitry that distributes selectively actuating pressure to the clutches and brakes to control transmission ratio changes wherein provision is made for interrupting distribution of a vehicle speed signal to the shift valves for controlling high speed ratio changes when the vehicle speed during coasting of the vehicle falls below a calibrated value thereby triggering an automatic downshift to an intermediate ratio at a precise downshift point.

8 Claims, 3 Drawing Figures

COASTING DOWNSHIFT CONTROL VALVE FOR AN AUTOMATIC POWER TRANSMISSION CONTROL VALVE CIRCUIT

GENERAL DESCRIPTION OF THE INVENTION

My invention is adapted to be used in a control circuit of the type disclosed in U.S. Pat. No. 3,446,098, which is assigned to the assignee of this invention. Many of the circuit elements described in U.S. Pat. No. 3,446,098 may be used in the control system described in this specification. Since that patent may be used to supplement this disclosure, a description of the common control features will not be repeated here. This specification will be directed particularly to the 3-2 coasting control valve and the related shift valve circuitry.

A control system that is adapted to accommodate the improvement of my invention includes a fluid pressure source connected drivably to the torque-delivery elements of the transmission mechanism and fluid pressure operated servos for actuating and releasing clutches and brakes that in turn control the relative motion of the gear elements of a transmission mechanism to establish multiple forward driving speed ratios as well as a single reverse speed ratio. Conduit structure connects the servos to the pressure source. Control valves in the conduit structure provide effective regulation of the pressure made available to the servos, and shift valves selectively distribute the regulated pressure to the servos in order to condition the driveline for the most efficient operation for any given driving mode. The shift valves respond to a throttle pressure signal that is generally related to driving torque distributed through the driveline and they respond also to a governor pressure signal that is proportional to the driven speed of the power output portion of the transmission mechanism.

During acceleration from a standing start, the servos are conditioned by the valve system to establish the lowest forward driving ratio. The 1-2 shift valve, at an instant early in the acceleration period, responds to changes in the engine throttle pressure and the governor pressure to effect a ratio change from the lowest speed ratio to an intermediate ratio. At an instant later in the acceleration mode, the 2-3 shift valve is actuated by the combined action of the throttle pressure and the governor pressure to effect a ratio change automatically from the intermediate ratio to the high speed ratio. The shift valves are calibrated to establish the upshift points at the instant that will result in optimum vehicle performance as well as smoothness in the ratio transition.

When the vehicle is coasting from a cruising condition and the vehicle engine is being driven by the vehicle wheels rather than vice-versa, it is desirable to establish a 3-2 downshift point at a predetermined speed that is sufficiently high to maintain the most effective engine braking action and to reduce as much as possible the effect of the coasting or engine braking condition on the emission of undersirable pollutants in the engine exhaust gases. Undesirable exhaust emissions are reduced in a typical automative vehicle driveline if a coasting 3-2 downshift occurs at a speed of approximately 16 m.p.h. rather than at a lower value.

It is desirable also to effect a 3-2 coasting downshift at a precise shift point and to provide in the circuitry for the transmission mechanism 3-2 coasting downshift valve that may be calibrated to maintain that shift point regardless of the calibration that may be necessary for the 2-3 shift valve to effect and to maintain the proper 2-3 upshift point. Calibration for the 3-2 coasting downshift then can be done independently of those considerations that affect the timing and the quality of a 2-3 upshift during the usual forward driving mode under torque.

The separation of these two control functions; that is, the 3-2 coasting control function and the 2-3 upshift function during normal operation under torque; can effectively be obtained while using a 3-2 coasting downshift limit valve that is situated in the circuitry between the fluid pressure governor and fluid pressure sensitive portions of the 2-3 shift valve assembly. The limit valve is subjected to governor pressure and is adapted either to exhaust the governor pressure passage extending to the 2-3 shift valve assembly or to connect that passage to the governor pressure source.

The operating condition that is assumed by the limit valve depends upon vehicle speed. The transition from a governor pressure delivery condition to a governor pressure exhaust condition is controlled solely by the calibration of the valve itself. Calibration is independent of any of the other design parameters that affect ratio changes.

PARTICULAR DESCRIPTION OF THE INVENTION

Figure 1:
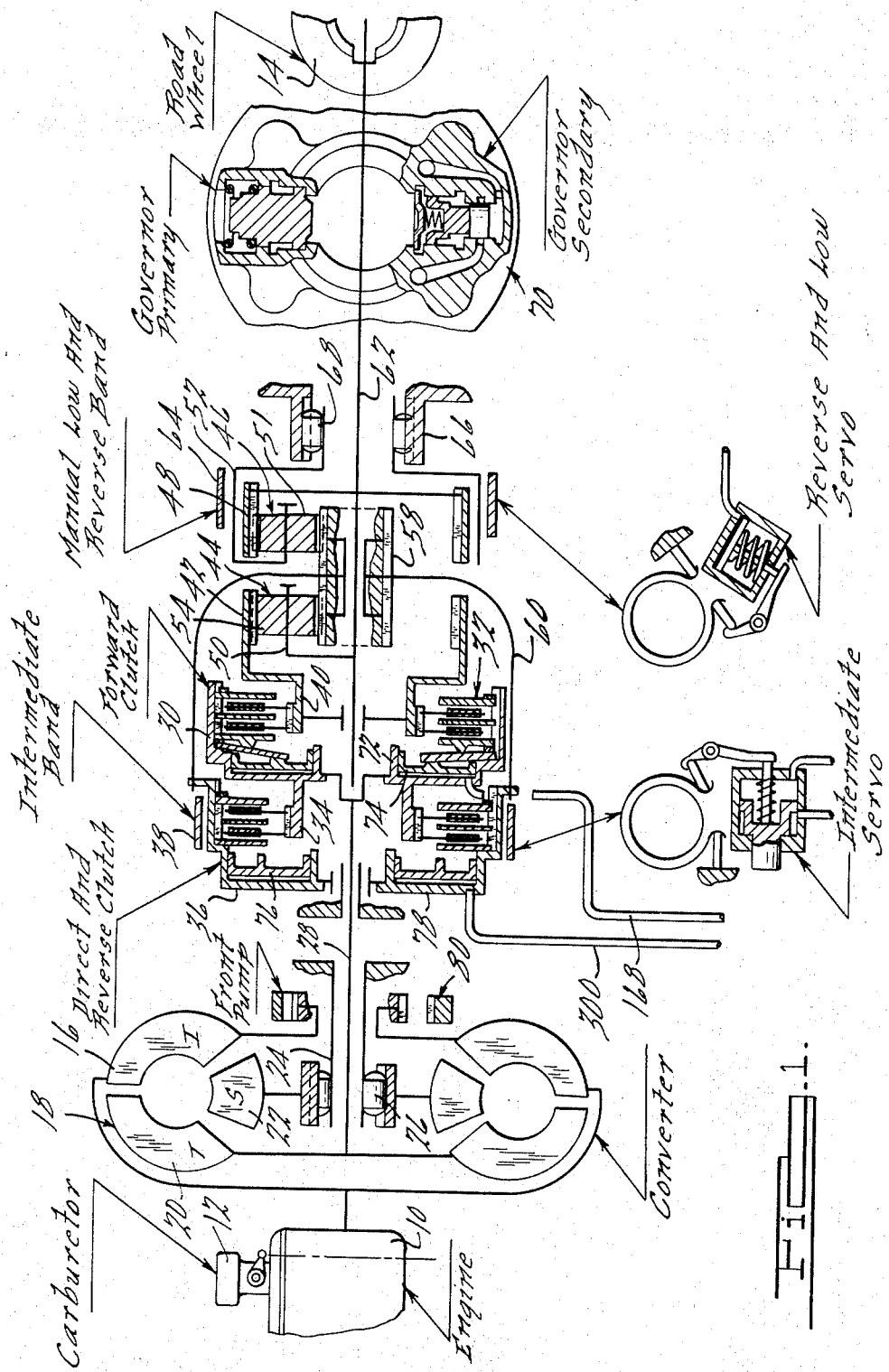
FIG. 1 is a schematic assembly view of a power transmission mechanism adapted to be controlled by the improved valve circuit of my invention.

In FIG. 1 numeral 10 designates generally an automotive vehicle, internal combustion engine. It is provided with an air-fuel mixture carburetor 12 which supplies the combustion cylinders of the engine with a combustible mixture through an intake manifold system. The pressure in this manifold system is used as an operating variable for the transmission valve system that I will describe.

The vehicle includes road wheels 14 which are connected to the power output shaft of the transmission system through a suitable driveshaft and differential axle assembly.

The engine crankshaft is connected to the impeller 16 of a hydrokinetic torque converter 18. The impeller 16 is situated in toroidal fluid flow relationship with respect to a bladed turbine 20. A bladed stator 22 is located between the turbine flow exit and the impeller flow entrance in the usual fashion.

A stationary stator sleeve shaft 24, which is connected to the relatively stationary transmission housing, supports the stator 22. An overrunning brake 26 anchors the stator 22 to the stator shaft 24 and inhibits rotation of the stator in one direction although it accommodates freewheeling motion in the opposite direction.

The turbine 20 is connected directly to turbine shaft 28. A clutch drum 30 is connected directly to the turbine shaft 28. This drum forms a part of a multiple disc clutch assembly 32 which is engaged during forward drive operation in each of the forward drive speed ratios. It is identified in FIG. 1 as a forward clutch.

Drum 28 carries clutch element 34 which forms a part of a multiple disc clutch assembly 36. A friction brake band 38 surrounds an outer drum portion of the clutch 36. It is identified in FIG. 1 as the intermediate band. It is applied and released by an intermediate servo which comprises a cylinder within which is positioned a movable piston that is drivably connected to the operating end of the band 38. The piston and the cylinder cooperate to define a pair of opposed fluid pressure chambers. When both chambers are applied, the brake band is released. When the right-hand pressure chamber is exhausted and the left-hand pressure chamber is pressurized, the brake band is applied.

Forward clutch 32 includes a clutch element 40 which is connected directly to ring gear 42 of a simple planetary gear unit 44. A companion simple planetary gear unit 46 comprises a ring gear 48 and a carrier 52. This corresponds to carrier 50 of the planetary gear unit 44. Carrier 50 journals rotatably a plurality of planet pinions 54 and carrier 52 carries rotatably a plurality of planet pinions 51. Gear units 44 and 46 share a common sun gear 58.

Carrier 52 defines a brake drum about which is positioned a brake band 64. This band is applied and released by a reverse-and-low servo. The bank is identified in FIG. 1 as the manual low-and-reverse band.

The reverse-and-low servo comprises a cylinder and a piston which cooperate to define a pressure chamber. As the chamber is pressurized, the brake band is applied. A piston release spring disengages the brake band as fluid pressure is exhausted from the servo.

The sun gear 58 is drivably coupled to the clutch drum for the direct-and-reverse clutch 36 by means of a drive shell 60. This shell surrounds the gear unit 44 and the multiple disc clutch assembly 32.

Carrier 50 is connected directly to the power output shaft 62. Carrier 52 is adapted to be anchored to the relatively stationary housing of the transmission mechanism by an overrunning clutch shown in part at 66. The clutch comprises an outer race connected directly to the transmission housing, and an inner race connected to the carrier 52. Overrunning brake rollers 68 are situated between the races. One of the races is cammed to permit a camming action with the roller 68, thereby inhibiting rotation of the carrier 52 in one direction but permitting freewheeling motion in the opposite direction.

Brake 66 complements the action of the brake 64. The latter can be applied during manual low range operation and during reverse drive. When the operator desires an automatic ratio change from a low speed ratio to the intermediate speed ratio, however, overrunning brake 66 provides the sole means for accommodating torque reaction. The brake band 64 is released.

The governor valve assembly 70 is connected directly to the shaft 62. It comprises a primary governor and a secondary governor, which provide a speed sensitive pressure signal that is utilized by the automatic control valve circuit.

The forward clutch is applied by a clutch servo comprising a clutch cylinder 72 in which is positioned a clutch piston 74. The cylinder and piston, which cooperate to define a pressure cavity, applies and releases the friction discs of the forward clutch. A cylinder 78 within which is positioned a piston 76, comprises a servo for the direct-and-reverse clutch. Fluid pressure can be applied to the clutch servos through feed passages, as will be explained subsequently with reference to FIGS. 2A and 2B.

Figure 2A:
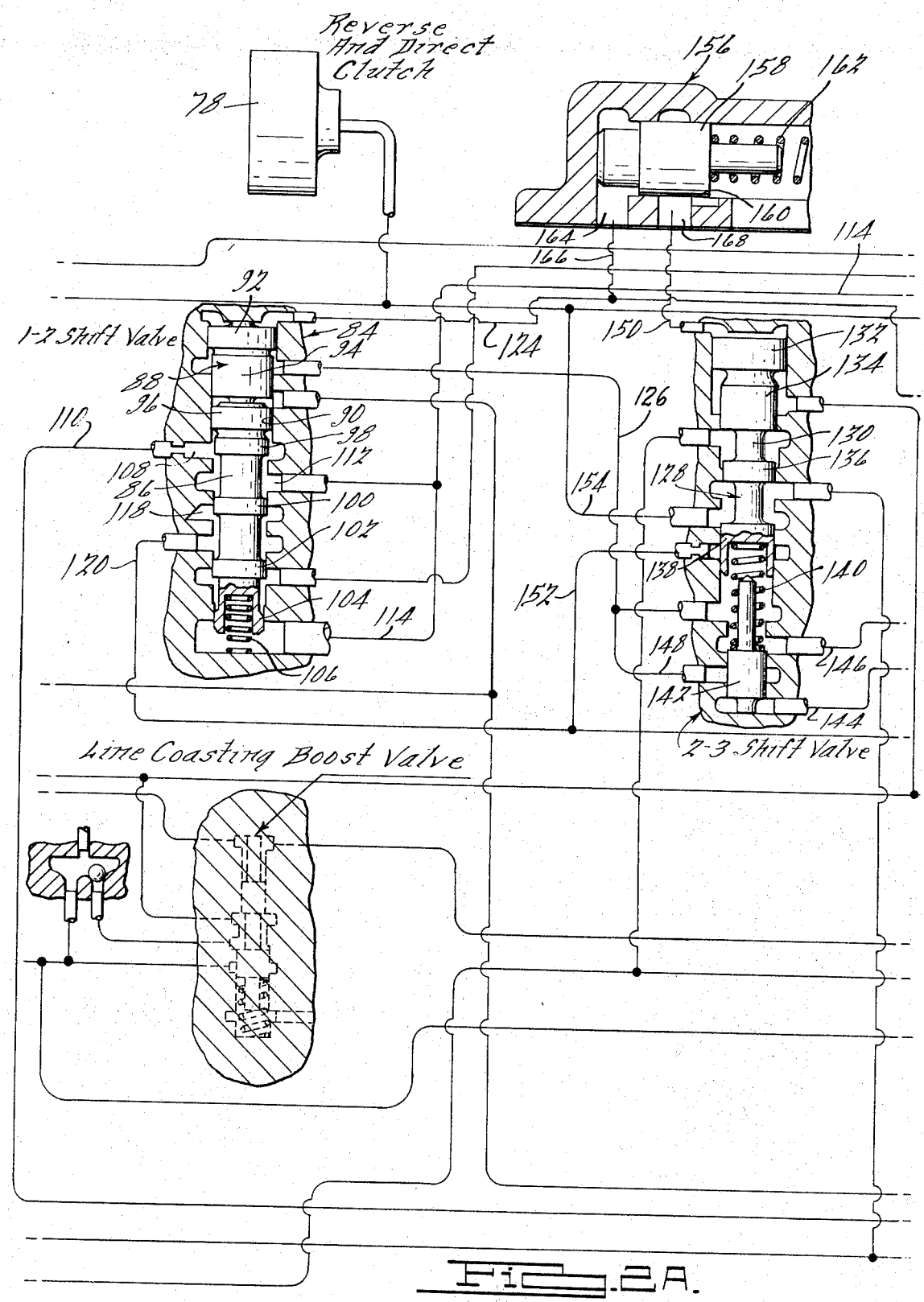
FIGS. 2A and 2B show a schematic representation of a portion of the control valve circuitry for the mechanism of FIG. 1.
Figure 2B:
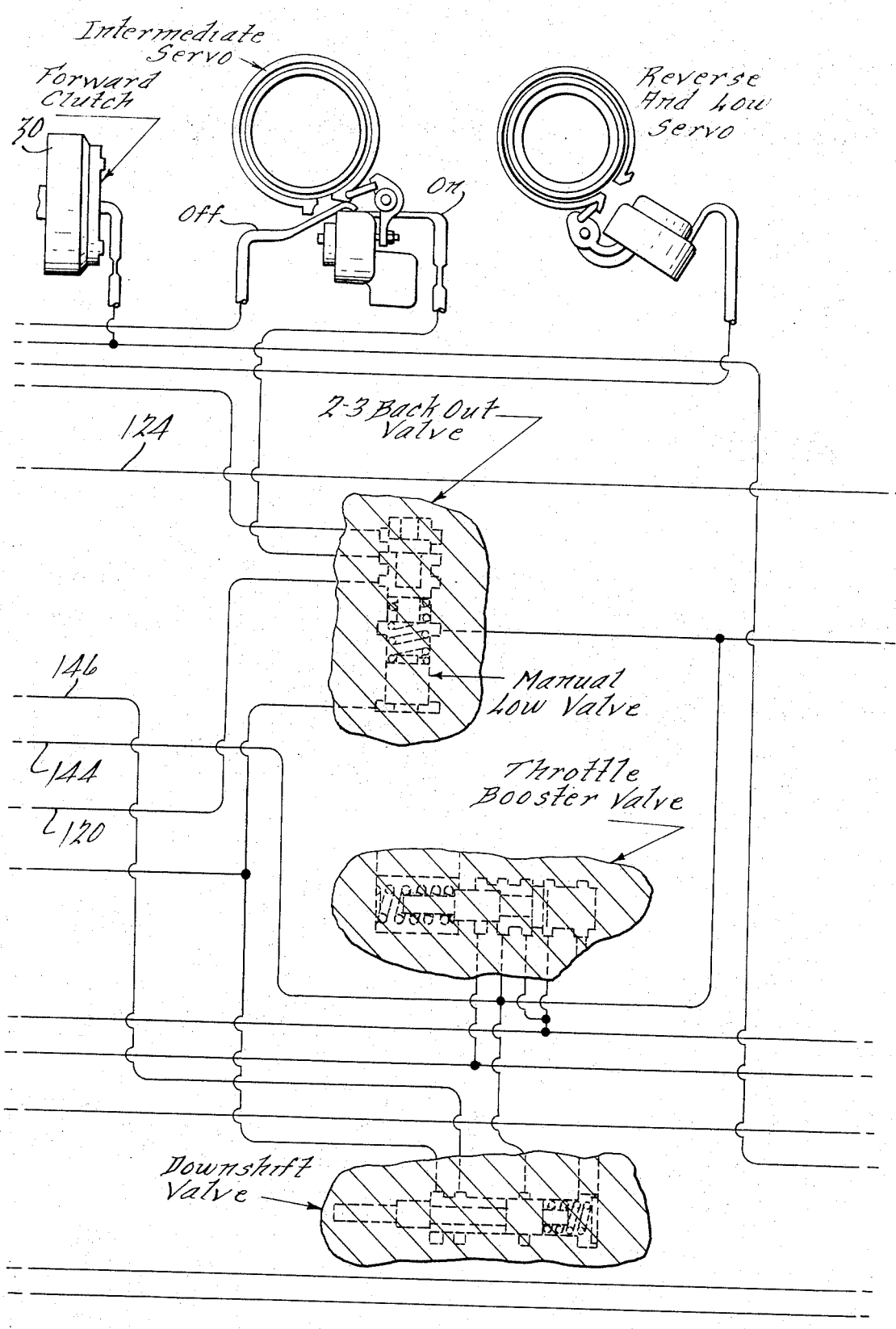

The front pump for supplying circuit pressure for the control valve circuit of FIGS. 2A and 2B is driven by the impeller, as indicated schematically in FIG. 1.

To condition the mechanism for operation in the low speed range, brake band 64 is applied. Multiple disc clutch assembly 32 is applied as it is during operation in any of the forward drive speed ranges. Turbine torque, which is developed by the torque converter 18, is transferred through the turbine shaft 28 and through the engaged clutch 32 to the ring gear 42. The resistance to movement of the carrier 50 offered by the output shaft 62 causes the sun gear 58 to rotate in a backward direction relative to engine rotation. This causes ring gear 48 to rotate in the direction of rotation of the engine as the carrier 52 is anchored by the brake 64. Ring gear 48 delivers its torque directly to the shaft 62. Thus a split torque delivery path is provided, with a portion of the torque being delivered to each of the three gear units.

If continued operation in the low speed ratio is not desired, the torque reaction of the carrier 52 can be accommodated by the overrunning brake 66 rather than the brake band 64. This is the case whenever the transmission is conditioned for automatic ratio changes in the forward drive range.

To initiate a change in the speed ratio from the low speed ratio to the intermediate speed ratio, brake band 38 is applied. If brake band 64 was used during low speed ratio operation, it is released. The forward clutch 32 remains applied. Thus the sun gear 58 now becomes a reaction member as turbine torque is delivered to the ring gear 42. Torque multiplication occurs through the gear unit 44, and gear unit 46 has no function at this time.

To condition the mechanism for operation in the high speed ratio range, brake band 38 is released and clutch 36 is applied. Clutch 32, as mentioned earlier, remains applied. All the brakes are released. The clutches thus connect together the elements of the gearing for rotation in unison with a 1:1 drive ratio.

Reverse drive is achieved by disengaging the forward clutch 32 and engaging the direct-and-reverse clutch 36. At the same time the brake band 64 is applied and the brake band 38 is released. Turbine torque then is delivered from the shaft 28 and through the clutch 36 to the sun gear 58. Carrier 52 acts as a reaction member as the ring gear 48 is driven backward by the ring gears 58. The reverse motion of the ring gear 48 is imparted to the output shaft 62.

Ratio changes from a low speed ratio to the intermediate speed ratio during the acceleration mode are controlled by the 1–2 shift valve 84. This comprises two movable valve elements 86 and 88 situated slidably within a common valve chamber 90. Valve element 88, which includes differential diameter valve lands 92 and 94, engages the upper valve land 96 of valve element 86.

In addition to land 96, valve element 86 includes spaced valve lands 98, 100, 102 and 104. Valve spring 106 acts on valve element 86 and urges it upwardly as indicated in FIG. 2A. Land 98 is smaller in diameter than adjacent land 96, thereby creating a differential area that is in fluid communication with port 108. This port is pressurized by passage 110 when the transmission is conditioned for reverse drive operation. At that time, communication is established between port 108 and port 112 located between the lands 98 and 100. Port 112 in turn communicates with passage 114 which extends to the reverse-and-low servo. Passage 114 also communicates with the lower end of land 104 of the valve element 86 thereby hydraulically locking the valve element 96 in the position shown in FIG. 2.

Line pressure is distributed to the upper end of land 96 through passage 116. When continuous operation in the intermediate speed ratio is desired, the pressure force acting on land 96 urges the valve element 86 in a downward direction against the force of spring 106.

Land 100 controls the opening of exhaust port 118 to passage 120, the latter being located between the lands 100 and 102. When the valve element 86 is in the position shown, communication is established between passage 120 and port 118. Passage 120 communicates with the apply side of the intermediate servo. When the valve element is moved in a downward direction, communication is established between passage 122 and passage 120 as passage 114 is exhausted through the exhaust port 118. This causes line pressure to be distributed to the apply side of the intermediate servo thereby conditioning the transmission mechanism for operation in an intermediate ratio.

Movement of the valve element 86 in a downward direction takes place under the influence of governor pressure acting on the upper end of land 92. Governor pressure is distributed to land 92 through governor pressure passage 124. This passage receives its governor pressure from the governor pressure mechanism illustrated schematically in FIG. 1. The governor pressure force is opposed by a throttle pressure signal in passage 126 which communicates with the differential area provided by lands 92 and 94 on the valve element 88. This throttle pressure is the same pressure that acts upon the 2-3 shift valve which is indicated in FIG. 2 by reference character 128.

Valve 128 includes a movable valve spool 130 having axially spaced valve lands 132 and 134, 136 and 138. Valve spring 140 acts on the lower land 138, and it is seated on modulator valve element 142 situated below the valve element 130 in a common valve chamber. An engine throttle pressure signal, which is an indicator of engine torque, is distributed to the lower side of the element 142 through passage 144. Passage 146 which communicates with the valve chamber above line 142 normally is exhausted during operation in the forward drive automatic speed ratio drive range. Passage 148 receives a modulated pressure signal which is distributed to the passage 126 and to the lower end of the land 138 thereby assisting the spring force of spring 140. The trottle pressure force and the spring force oppose the force of governor pressure acting on the upper end of land 132. Governor pressure is distributed to the land 132 through governor pressure passage 150.

When the valve element 130 is moved in an outward direction, line pressure in passage 152 is transferred through a valve chamber for valve element 130 to passage 154 which extends to the release side of the intermediate servo and to the high clutch 78. Line pressure is distributed to passage 152 whenever the 1-2 shift valve is moved to its upshift position.

The 3-2 cruising downshift limit valve is indicated in FIG. 2 by reference character 156. It includes a movable valve element 158 positioned slidably within chamber 160. Valve element 158 is urged in a left-hand direction, as viewed in FIG. 2, by valve spring 162. An inlet governor pressure port 164 communicates with governor pressure passage 166, which in turn extends from the 1-2 shift valve 84. An outlet pressure port 168 communicates with valve chamber 160 at a location adjacent the larger diameter portion of the valve element 158. It communicates with governor pressure passage 150 which extends to the 2-3 shift valve 128. The portion of the valve chamber for valve 156 which is occupied by spring 162 is exhausted through a suitable exhaust port. When valve element 158 is in the left hand position as viewed in FIG. 2, passage 150 becomes exhausted and communication between passages 150 and 166 is interrupted. When the governor pressure in passage 166 is sufficient to shift the valve element 158 in a right-hand direction against the opposing force of spring 162, communication is re-established between passages 166 and 150 thereby allowing governor pressure to be distributed to the upper end of land 132 of the 2-3 shift valve assembly 128.

The valve 156 is calibrated to shift in a left-hand direction when the vehicle coasts during operation in a high speed ratio and when the vehicle speed is reduced to a value less than 16 m.p.h. Distribution of governor pressure to the 2-3 shift valve 128 then immediately is interrupted and a 3-2 downshift occurs at that instant. The 3-2 coasting downshift point thus is a function only of the calibration of valve 156 rather than a function of the other valve characteristics.

Upshifts occur during acceleration at speeds greater than 16 m.p.h. Valve 156 has no influence on the 2-3 upshift points. Thus the 3-2 coasting downshift and the 2-3 upshift points can be calibrated independently. It is not necessary to compromise the calibration for proper 3-2 coasting downshifts to avoid undesirable changes in the upshift characteristics. The converse also is true.

Having thus described a preferred embodiment of my invention, what I claim and desire to secure by U.S. Letters Patent is:

1. In a control for an automatic power transmission mechanism having multiple ratio gearing and fluid pressure operated clutches and brakes for controlling the relative motion of the elements of the gearing, a pressure source, conduit structure connecting the pressure source to said clutches and brakes, said conduit structure being defined in part by first and second pressure distributor valves, a source of a governor pressure signal, a governor pressure passage including a first portion connecting said signal source to a first of said distributor valves and a second portion connecting said signal source to the second of said distributor valves, each valve assuming a first position that conditions it for pressure distribution to effect an underdrive ratio, the pressure forces developed by said governor pressure signal on said distributor valves normally urging said distributor valve to a second position that conditions the mechanism for operation in a higher speed ratio, and a coasting downshift pressure limit valve in said other governor passage portion including a pressure area thereon in fluid communication with said governor pressure signal source, spring means normally urging said limit valve against the opposing force of governor pressure signal force acting thereon, said limit valve being adapted to interrupt distribution of pressure to said second distributor valve through said second governor pressure passage portion at speeds less than a predetermined value and establishing such communication at higher speeds.

2. A control valve circuit for an automatic power transmission mechanism adapted to deliver driving torque from a driving member to a driven member having gear elements adapted to establish multiple speed ratios, fluid pressure operated clutch-and-brake means for controlling the relative motion of said gear elements to establish ratio changes, a fluid pressure source, conduit structure connecting said pressure source and said clutch-and-brake means including a low speed ratio shift valve and a high speed ratio shift valve, means for distributing a first pressure signal to said shift valves that tends to urge each shift valve to its low speed ratio position, spring means for supplementing the valve operating forces of said first pressure signal, a source of a second pressure signal that is proportional in magnitude to the driven speed of said driven member, pressure passage means connecting said second signal source to each of said shift valves including separate portions communicating with the shift valve that oppose the force of said spring means and said first signal, said shift valves being adapted to assume a high speed ratio position upon an increase in the speed of said driven member, and a pressure limit valve communicating with a portion of said pressure passage means extending to the high speed ratio shift valve, said limit valve including a movable valve element in communication with said second signal source and movable by the force developed by said second signal to a position that establishes communication between said second signal source and said last-named distributor valve when the speed of said driven member exceeds a calibrated value, said limit valve interrupting said communication when the driven speed falls below a predetermined value.

3. The combination set forth in claim 1 wherein said clutches and brakes include an intermediate ratio brake and a direct drive clutch, said intermediate ratio brake including a pressure apply portion communicating with said first distributor valve and a pressure release portion communicating with the other of said distributor valves, said clutch being hydraulically connected to the release portion of said intermediate ratio brake whereby said clutch is applied and said brake is released when said other distributor valve is moved to a high ratio speed position under the influence of increasing governor pressure in said governor pressure passage.

4. A control circuit as set forth in claim 2 wherein said clutch-and-brake means includes an intermediate speed ratio brake and a direct drive high speed clutch, said intermediate speed ratio brake including a pressure apply portion communicating with the low speed ratio shift valve and a pressure relief portion communicating with the said high speed ratio shift valves, said clutch being hydraulically connected to the release portion of said intermediate speed ratio brake whereby said clutch is applied and said brake is released when said high ratio shift valve is moved to a high ratio position under the influence of increasing governor pressure in said governor pressure passage.

5. A control circuit as set forth in Claim 1 wherein said clutches and brakes include an intermediate speed ratio brake and a direct drive clutch, said intermediate speed ratio brake including a pressure apply portion communicating with said first distributor valve and a pressure release portion communicating with the other of said distributor valves, said clutch being hydraulically connected to the release portion of said intermediate speed ratio brake whereby said clutch is applied and said brake is released when said other distributor valve is moved to a high ratio speed position under the influence of increasing governor pressure in said governor pressure passage, the calibration of the spring forces and the pressure forces of said first signal on said shift valve determining the shift point at which a ratio change occurs from an underdrive ratio to a high speed ratio, each of the upshifts occurring at a higher speed for any given spring force and any given pressure force of said first pressure signal than the predetermined speed at which said limit valve interrupts communication between the second distributor valve and said second pressure signal source.

6. A control as set forth in claim 2 wherein said clutch-and-brake means includes an intermediate speed ratio brake and a direct drive high speed clutch, said intermediate speed ratio brake including a pressure apply portion communicating with said first distributor valve and a pressure release portion communicating with the other of said distributor valves, said clutch being hydraulically connected to the release portion of said intermediate speed ratio brake whereby said clutch means is applied and said brake means is released when said other distributor valve is moved to a high ratio speed position under the influence of increasing governor pressure in said governor pressure passage, the calibration of the spring forces and the pressure forces of said first signal on said shift valves determining the shift point at which a ratio change occurs from an underdrive ratio to a high ratio, each upshift occurring at a higher speed for any given spring force and any given pressure force of said first pressure signal than the predetermined speed at which said limit valve interrupts communication between said high speed ratio shift valve and said second pressure signal source.

7. A control valve circuit for an automatic power transmission mechanism adapted to deliver driving torque from a driving member to a driven member having gear elements adapted to establish multiple speed ratios, fluid pressure operated clutch-and-brake means for controlling the relative motion of said gear elements to establish ratio changes, a fluid pressure source, conduit means for connecting said pressure source to said clutch-and-brake means including shift valve means for distributing pressure from said fluid pressure source to said clutch-and-brake means, a source of a first pressure signal that is related functionally to driving torque, a source of a second pressure signal that is proportional in magnitude to the driven speed of said driven member, means for distributing said first pressure signal to said shift valve means tending to urge the latter to a low speed ratio condition, spring means for supplementing the valve operating forces of said first pressure signal, pressure passage means for distributing a speed related pressure to said shift valve means thereby establishing a force on said shift valve means that opposes the force of said spring means and the force of said first signal, said shift valve means being adapted to assume a high speed ratio condition upon an increase in the speed of said speed related pressure for any given driving torque, a pressure modifier valve means communicating with said pressure passage means and said second pressure signal source for modifying the magnitude of the speed signal made available to said shift valve means by said modifier valve means including a movable valve element in communication with said second signal source and movable by the force developed by said second pressure signal to descrease the effective signal pressure made available to said shift valve means as the magnitude of said second pressure signal is reduced whereby said shift valve means assumes a downshift condition when the magnitude of the pressure of said second pressure signal source falls below a predetermined value.

8. A control valve circuit for an automatic power transmission mechanism adapted to deliver driving torque from a driving member to a driven member having gear elements adapted to establish multiple speed ratios, fluid pressure operated clutch-and-brake means for controlling the relative motion of said gear elements to establish ratio changes, a fluid pressure source, conduit means for connecting said pressure source to said clutch-and-brake means including shift valve means for distributing pressure from said fluid pressure source to said clutch-and-brake means, a source of a first pressure signal that is related functionally to driving torque, a source of a second pressure signal that is proportional in magnitude to the speed of said driven member, means for distributing said first pressure signal to said shift valve means tending to urge the latter to a low speed ratio condition, spring means for supplementing the valve operating forces of said first pressure signal, pressure passage means for distributing a speed related pressure to said shift valve means thereby establishing a force on said shift valve means that opposes the force of said spring means and the force of said first signal, said shift valve means being adapted to assume a high speed ratio condition upon an increase in the speed of said speed related pressure for any given driving torque, a pressure modifier valve means communicating with said pressure passage means and said second pressure signal source for modifying the magnitude of the pressure signal made available to said shift valve means, said modifier valve means including a movable valve element in communication with said second pressure signal source and responsive to changes in the speed of said driven member to produce an effective speed signal for said shift valve means that differs from the corresponding second pressure signal whereby the downshift condition of said shift valve means may be controlled for any given driving torque as the speed of said driven member is reduced.

* * * * *